JAMES E. HURST
INVENTOR.

ATTORNEYS

United States Patent Office 3,515,972
Patented June 2, 1970

3,515,972
CENTRIFUGAL SWITCHING MEANS FOR D.C.
MOTOR SPEED CONTROL
James E. Hurst, Rochester, N.Y., assignor to Eastman
Kodak Company, Rochester, N.Y., a corporation of
New Jersey
Filed Apr. 22, 1968, Ser. No. 723,093
Int. Cl. H02p 5/08
U.S. Cl. 318—325                           10 Claims

ABSTRACT OF THE DISCLOSURE

This invention relates to a centrifugal switch for controlling the speed of a battery powered motor. Two weighted members are suspended by a cable-leaf spring in combination, supported in a housing mounted on the motor shaft, the arrangement being such that when a predetermined speed is exceeded, an insulating member carried by the leaf spring is axially displaced in a direction so as to reduce the pressure on a pair of resilient conductive members, permitting the contacts which they carry to open to thereby de-energize the electric circuit to the motor. As the motor slows down, the centrifugal force on the weighted members is lessened, and under the restoring discipline of the leaf spring, the insulating member is displaced in the opposite direction so as to force the contacts into electrical union to restore the electrical continuity to the motor circuit.

BACKGROUND OF THE INVENTION

The invention relates to a centrifugal switching means for energizing and de-energizing a battery-powered D.C. electric motor, so as to maintain the speed of the motor within predetermined limits.

It is broadly known to use centrifugal switching arrangements for the purpose of controlling the speed of a motor. Examples of the prior art are indicated by the U.S. Pat. 2,138,801 to Young for a centrifugal switch, and U.S. Pat. 2,971,432 to Blank for a D.C. motor speed control and signaling system, particularly designed for motion picture cameras.

The present invention provides a centrifugal switching arrangement for electric motor speed control for opening and closing electrical contacts, connected to a battery source, in which weighted members suspended by a cable-leaf spring combination, provide a flexible, easily adjusted device, having light-weight and low frictional losses, particularly adapted for use in a portable motion picture camera.

SUMMARY OF THE INVENTION

The invention relates to a centrifugal switching means suitable for controlling the speed of a battery powered electric motor, especially adapted for use with a motion picture camera or the like. A resilient member, carrying an insulating member, is supported within a housing which is mounted on the shaft of the motor. Two weighted members arranged in separate wells within the housing are supported at the ends of a cable which is threaded through a suitable aperture in the insulating member. A pair of resilient contacts, in series with the battery source are physically urged into electrical contact at a predetermined speed of the motor, and when that predetermined speed is exceeded, the weighted members, under centrifugal force, reduce the pressure on the contacts, permitting them to open, so that the motor is de-energized. When centrifugal forces are reduced under the lowered motor speed, the insulating member is returned to its former position under the discipline of the resilient member. The response of the switching means is almost instantaneous because of the very small frictional losses, the centripetal force of the cable, and the concommitant centrifugal force on the weighted members developing rapidly in response to incremental changes in motor speed.

Accordingly, it is an object of the invention to provide the centrifugal switching means for a battery powered motor, which has low frictional losses, and which rapidly responds with corrective influence to incremental changes in motor speed.

The novel features of the invention are set forth with particularity in the appended claims. The invention itself, however, and method of operation, together with further objects and advantages thereof, may thus be understood by reference to the description to follow, considered in connection with the accompanying drawings.

DESCRIPTION OF THE PREFERRED EMBODIMENT

Before proceeding with a description of the invention, it will be helpful to briefly consider the environmental background in which the invention is intended to play a role.

In taking pictures by motion picture camera, it is necessary that the speed of operation of the camera shutter, as well as the film transport mechanism, be regulated within fairly narrow limits, in order that the developed pictures may be projected free from flicker.

The problem is particularly acute in portable motion picture cameras, because they are usually operated by dry cells, and as these cells deteriorate, either through prolonged use, or from normal shelf decline, temperature changes, and the like, the cells reach such a weakened condition, that even though the camera motor continues to operate, its speed may be reduced to the point where the developed film may be unsatisfactory when projected on a screen. In order to provide satisfactory operation for as long as possible, it is a frequent device to provide a battery capacity of somewhat greater potential than is actually required, so as to provided a margin of safety as deterioration progresses. In order to do this successfully, it is then necessary to provide some means for efficient speed regulation since the greater voltage will drive the motor at a higher speed, and as far as projection of the developed film is concerned, too great a speed is just as deleterious as not enough.

Figure 1:
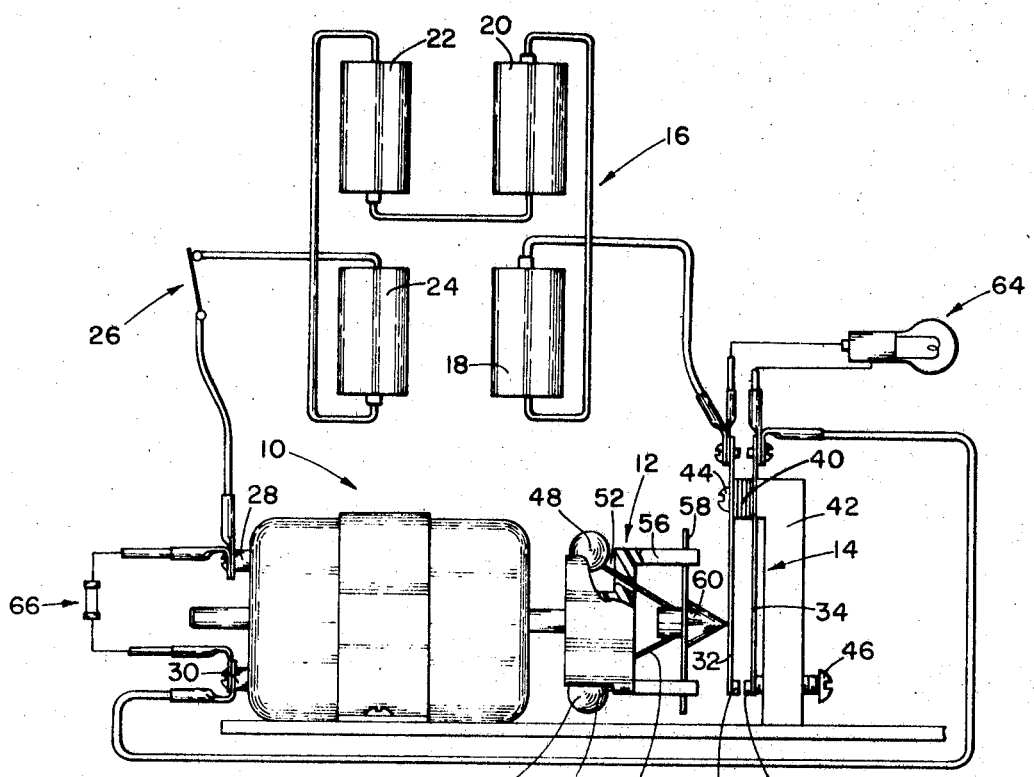
FIG. 1 is a partial sectional pictorial view showing the centrifugal switching means of the instant invention utilized for a battery powered motor particularly adapted for use in a movie camera, and showing the actuation of the centrifugal switching means to de-energize the motor circuit.

Referring now to FIG. 1, a direct current motor is indicated generally at 10; this motor is intended for use in a movie camera and may have a torque rating in the order of .2 oz. in. A centrifugal switch is indicated generally at 12, and a stationary electrical switching means is indicated generally at 14. The D.C. battery source for the electric motor 10 may be supplied by a battery source indicated generally at 16 and comprising four dry cells, 18, 20, 22, 24, connected in series through a manually controlled switch, indicated symbolically at 26, and to the motor terminals indicated at 28 and 30.

The stationary electrical switching means 14 comprises two conductors 32, 34, carrying contacts 36, 38, respectively. The conductors 32, 34 are electrically insulated from each other by means of an insulation block 40, secured to a post member 42, by means of a screw 44. The post 42 carries a screw means 46, which may be rotated to move the conductor 34 and its contact 38, so as to adjust the distance between the opposed contacts 36, 38.

Figure 2:
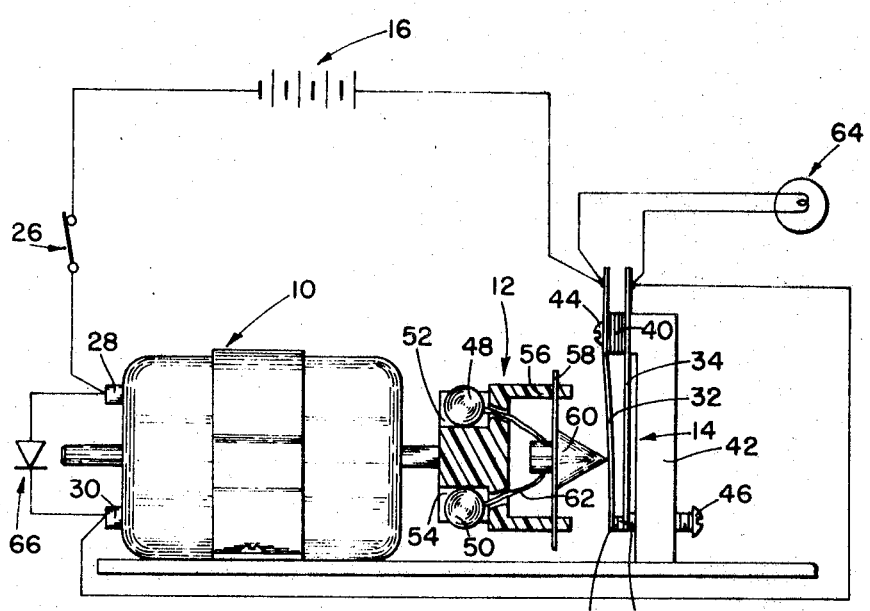
FIG. 2 is a schematic view showing the same battery powered motor operating at a predetermined speed, as the centrifugal switch means is actuated to re-energize the motor circuit.

As may be seen in FIG. 2, the centrifugal switch 12 comprises weighted balls 48, 50, positioned in wells 52, 54, respectively, in a rotatable housing member 56 mounted on the motor shaft. Advantageously, the housing 56 may be fabricated from plastic materials. The rotatable housing or carriage member 56 supports a resilient means 58 which may be a leaf spring member which is adapted to carry an insulating member or point 60. The balls 48, 50 are secured to a light cable or string 62, formed in a shape of a loop and threaded through a suitable aperture in the rotatable point 60. An indicating lamp 64 is connected between the conductors 32, 34 as shown.

Completing the description now, a transient suppressing Zener diode 66 is connected between terminals 28 and 30, the anode being connected to terminal 28 and the cathode being connected at the terminal 30.

In operation of the device, the screw member 46 is adjusted to provide the desired spacing between the contacts 36, 38. When this is done, the motor will be set to run at a specific r.p.m. The manual switch 26 is located at any convenient point on the portable camera, and when it is desired to energize the electric motor for picture taking, the switch 26 is closed. As shown in FIG. 2, this completes the electric path from the battery 16, through the electric motor 10. As the motor increases in speed, the balls 48, 50, under the influence of centrifugal force, fly outwardly, so as to rectilinearly displace the rotating point 60 axially to the left, as viewed in FIGS. 1 and 2. In doing so, the contacts 36, 38 are opened, thereby opening the electric circuit to de-energize the motor. As the motor speed is lessened, the balls 48, 50 retreat into their normal position in the wells 52, 54 shown in FIG. 2, so that under the discipline of the resilient member 58, the rotatable point 60 is displaced again to the right, displacing the conductor 32, so that contacts 36, 38 are electrically in union, thereby again energizing the motor 10.

The battery indicating light 64, since it is connected across the conductors 32, 34, remains shorted out only so long as the contacts 36, 38 remain closed, and therefore it will glow and darken in response to the motor r.p.m. excursions, thereby providing a visual indication of the condition of the battery 16. The blinking of the light 64 on and off provides an indication to the camera user that the battery is satisfactory. If the light should remain out, it is a sign that the cells are approaching the end of their useful life, and should be replaced. Alternatively, it is possible to connect the lamp 64 in a series electrical relationship with switching means 14 so that the lamp 64 will only be energized when the centrifugal switch 12 is not being actuated, so that continued energization of the light 64 would then indicate that the cells require changing.

The Zener diode 66 has a reverse bias breakdown of 9 volts and is placed across the motor terminals 28, 30, as shown. The arcing across the electrical contacts 36, 38 may reach approximately 50 volts without the diode 66 in the circuit—this could cause severe burning of the contacts. The diode 66, because of its breakdown characteristics, limits any arcing to no more than 9 volts, thus reducing the possibility of burning the contacts.

The centrifugal switching means of the instant invention may be used advantageously in a portable motion picture camera to provide excellent speed regulation for the camera motor. The light weight construction enables small frictional losses; additionally, as a result of the supporting of the weighted members by a cable-leaf spring combination, the response to incremental changes in speed is very rapid, the changes in motor speed producing an almost instantaneous centripetal response in the cable supporting the weight members.

The invention has been described in detail with particular reference to preferred embodiments thereof, but it will be understood that variations and modifications can be effected within the spirit and scope of the invention.

I claim:
1. In a cinematographic apparatus having an electric motor with an output shaft rotatable in response to energization of the motor and a pair of input terminals adapted for connection to a source of electrical power to effect energization of the motor, a centrifugal governor for automatically maintaining between predetermined upper and lower limits the speed at which the shaft rotates when the motor is energized, said governor comprising:
(a) a housing member mounted on the shaft for rotation therewith;
(b) a resilient member supported by said housing member and adapted to flex axially relative to the shaft from a first position to a second position when a predetermined force is applied and to return from the second position to the first position when the predetermined force is removed;
(c) an insulating member mounted on said resilient member for axial movement therewith as said resilient member flexes from the first position to the second position and returns to the first position;
(d) a plurality of weights supported by said housing member for radially outward movement relative to the shaft from respective inner positions to respective outer positions under the influence of centrifugal force resulting from an increase in the speed of shaft rotation from the predetermined lower limit to the predetermined upper limit;
(e) cord means having a plurality of end portions and a mid-portion, each of said end portions being coupled to a respective one of said weights, said mid-portion being coupled to said insulating member to apply the predetermined force to said resilient member in response to movement of said weights from the respective inner positions to the respective outer positions and to return said weights from the respective outer position to the respective inner positions as said resilient member returns from the second position to the first position;
(f) first and second electrical conductors connected in series with the input terminals, said first conductor being movable toward and away from said second conductor; and
(g) means for biasing said first conductor from a closed position wherein said conductors are in contact with each other to an open position wherein said conductors are not in contact with each other, said first conductor being disposed in an abutting relationship with said insulating member and in said closed position when said resilient member is in said first position, said first conductor being movable under the influence of said biasing means from said closed position to said open position as said resilient member flexes from said first position to said second position, said first conductor being returnable from said open position to said closed position against the influence of said biasing means as said resilient member returns from said second position to said first position;

whereby, when the speed of shaft rotation increases from the predetermined lower limit to the predetermined upper limit, said first conductor is moved from the closed position to the open position to thereby effect de-energization of the motor, and when the speed of shaft rotation decreases from the predetermined upper limit to the predetermined lower limit, said first conductor is returned from the open position to the closed position to thereby effect re-energization of the motor.

2. The centrifugal governor claimed in claim 1 further comprising a Zener diode connected across the input terminals to limit the arcing potential across said conductors.

3. The centrifugal governor claimed in claim 1 wherein said housing member includes means defining a plurality of chambers in which said weights are respectively supported for movement between the respective inner positions and the respective outer positions, and wherein said housing member further includes means defining a plurality of passageways through which pass respective portions of said cord means between said end portions and said mid-portion.

4. The centrifugal governor claimed in claim 1 wherein said resilient member includes a resilient plate transverse to the rotational axis of the shaft.

5. The centrifugal governor claimed in claim 1 wherein said insulating member includes means for receiving said mid-portion of said cord means.

6. The centrifugal governor claimed in claim 1 wherein said weights include two spherical balls.

7. The centrifugal governor claimed in claim 1 wherein said cord means includes a flexible cable having two end portions.

8. The centrifugal governor claimed in claim 1 further comprising means for adjusting the position of said second conductor.

9. The centrifugal governor claimed in claim 1 wherein said first conductor and said biasing means include a resilient strip of conductive material.

10. In a cinematographic apparatus having an electric motor with an output shaft rotatable in response to energization of the motor and a pair of input terminals adapted for connection to a source of electrical power to effect energization of the motor, a centrifugal governor for automatically maintaining between predetermined upper and lower limits the speed at which the shaft rotates when the motor is energized, said governor comprising:
 (a) a housing member mounted on the shaft for rotation therewith, said housing member including means defining a pair of chambers;
 (b) a resilient member supported by said housing member and transverse to the rotational axis of the shaft, said resilient member being adapted to flex along said axis from a first position to a second position when a predetermined force is applied thereto and to return from the second position to the first position when the predetermined force is removed therefrom;
 (c) an insulating member mounted on said resilient member for axial movement therewith as said resilient member flexes from the first position to the second position and returns from the second position to the first position;
 (d) a pair of weights in said chambers and movable radially outward relative to said axis from respective inner positions to respective outer positions under the influence of centrifugal force resulting from an increase in the speed of shaft rotation from the predetermined lower limit to the predetermined upper limit;
 (e) a flexible cable having two end portions and a mid-portion, each of said end portions being coupled to a respective one of said weights, said mid-portion being coupled to said insulating member to apply the predetermined force to said resilient member in response to movement of said weights from the respective inner positions to the respective outer positions and to return said weights from the respective outer positions to the respective inner positions as said resilient member returns from the second position to the first position;
 (f) first and second electrical conductors connected in series with the input terminals, said first conductor being movable toward and away from said second conductor;
 (g) means for biasing said first conductor from a closed position wherein said conductors are in contact with each other to an open position wherein said conductors are not in contact with each other, said first conductor being disposed in an abutting relationship with said insulating member and in said closed position when said resilient member is in said first position, said first conductor being movable under the influence of said biasing means from said closed position to said open position as said resilient member flexes from said first position to said second position, said first conductor being returnable from said open position to said closed position against the influence of said biasing means as said resilient member returns from said second position to said first position;
 (h) means for adjusting the position of said second conductor; and
 (i) means connected across the input terminals for limiting the arcing potential across said conductors;
whereby, when the speed of shaft rotation increases from the predetermined lower limit to the predetermined upper limit, said first conductor is moved from the closed position to the open position to thereby effect de-energization of the motor, and when the speed of shaft rotation decreases from the predetermined upper limit to the predetermined lower limit, said first conductor is returned from the open position to the closed position to thereby effect re-energization of the motor.

References Cited

UNITED STATES PATENTS

| | | | |
|---|---|---|---|
| 1,857,202 | 5/1932 | Lee | 318—325 |
| 2,971,432 | 2/1961 | Blank | 318—325 |
| 3,173,072 | 3/1965 | Blank | 318—325 |
| 3,177,418 | 4/1965 | Meng | 318—434 |

FOREIGN PATENTS 416,018  3/1946  Italy.

ORIS L. RADER, Primary Examiner

A. G. COLLINS, Assistant Examiner

U.S. Cl. X.R.

200—80; 318—462